J. Atkins,
Steam-Boiler Indicator.
N° 79,431. Patented June 30, 1868.
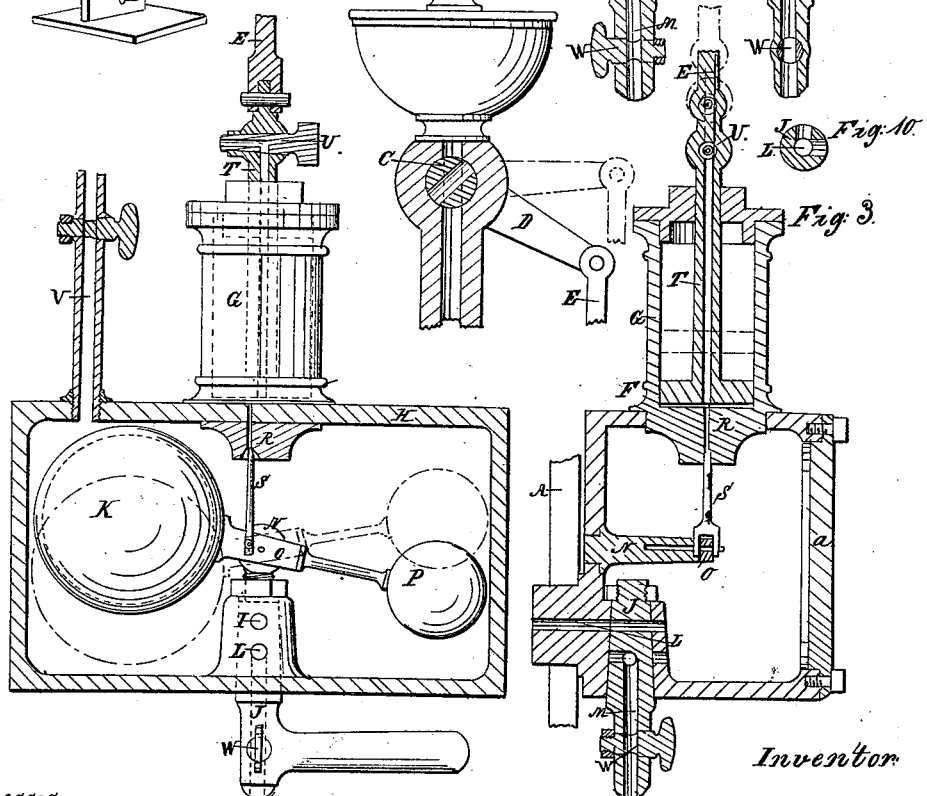

United States Patent Office.

JEARUM ATKINS, OF WASHINGTON, DISTRICT OF COLUMBIA.

*Letters Patent No. 79,431, dated June 30, 1868.*

---

IMPROVEMENT IN LOW-WATER ALARMS FOR BOILERS.

---

*The Schedule referred to in these Letters Patent and making part of the same.*

---

TO ALL WHOM IT MAY CONCERN:

Be it known that I, JEARUM ATKINS, of Washington, in the county of Washington, and District of Columbia, have invented a new and useful Improvement in Low-Water Alarms; and I do hereby declare the following to be a full, clear, and exact description of the same, reference being had to the accompanying drawings, in which—

Figure 1 is a perspective view of my apparatus in operative condition.

Figure 2 is a vertical longitudinal section of the same.

Figure 3 is a vertical cross-section of the same.

Figure 4 is an elevation of the alarm-whistle and its cock.

Figures 5, 6, 7, 8, 9, and 10 are vertical and cross-sections of the inlet and outlet-cock on the bottom of the apparatus.

The object of my invention is to construct a low-water alarm for steam-generators, with the following qualities: First, accessibility at all times, for the purpose of testing operative condition or for repair; second, sensitiveness; third, durability; fourth, operative power.

These qualities are all of them necessary to form a reliable alarm, and are, so far as I am aware, mostly if not altogether absent from all of the devices hitherto made for this purpose.

The principal characteristic of my invention is, that the limited power of a float, or other analogous device dependent for its operation upon the quantity of water within the boiler, is employed simply to unlock, as it were, the mechanism which is afterwards to be put in motion by steam at boiler-pressure. By these means I secure sensitiveness and operative power, and by locating my apparatus entirely outside of the boiler, I render it accessible at all times for trial or repair.

A low-water alarm, which depends upon the operation of a float enclosed within the boiler, is always subject to various defects, which will impair its efficiency and render it unreliable. The float is usually constructed in spherical form, of thin metal, and is frequently collapsed by the steam-pressure. If made with thickness of metal sufficient to enable it to withstand the steam-pressure, then it will be deficient in buoyancy, and in any event its available power is but little, if any, greater than is necessary to overcome the friction in moving the mechanism of the alarm. This friction is at all times liable to be increased by sedimentary deposits from the water, and said deposits are very frequently sufficient to prevent all motion of the alarm-mechanism. When these operative parts are within the boiler, and steam is being generated, they are inaccessible to the engineer, and he is unable to ascertain their condition. He cannot know whether or not the float has been collapsed, or if scale has cemented the joints so that it cannot operate. Sedimentary deposits are the principal cause of inefficiency in instruments of this class, and are only to be obviated by making the apparatus always accessible for inspection.

My apparatus is calculated to obviate all of the above-mentioned defects.

A is the head of a steam-boiler, and B is an ordinary alarm-whistle, mounted upon the top of said boiler, and taking steam therefrom in the usual way.

The cock C of the whistle B is operated by the lever D, attached to said cock, and the connecting-rod E, which couples said lever with the rod T of the piston F, which works in the small cylinder G. The cylinder G stands upon the box H, attached to the outer side of the boiler or its neighboring parts, and connected with the water-space of said boiler, through the port I, located at the lowest safe water-mark, and with the steam-space of said boiler by the pipe V. Water will stand in said box at a height level with the surface of the water in the boiler, and when the water in the boiler falls so low as to uncover the port I, then the steam will fill the box instead.

The port I may be closed by turning the cock-plug J, which is also provided with the port L and vent M, which may be opened to permit the enclosed water to escape from the box when it is desired to test the condition of the apparatus. The vent M may be opened either while the port I is also open, or while the steam-pipe V is open, so that whatever sediment may be loose in the box, may with ease be blown out; and this may be accomplished by a variety of modes of construction, as, for instance, the port L may be made two ways, as shown in figs. 6, 7, 9, and 10, so that when in position figs. 2 and 6, port I will be open, and port L will be closed. When in position figs. 5 and 7, both ports, I and L, will be open, and the contents of the box would be blown out; while in position figs. 9 and 10, port I would be closed and port L will be open. The steam-pipe V has a stop-cock, by which steam may be cut off from the box H, as shown in fig. 2.

If the plug J is made with only a single-way port at L, the same results may be attained, either by the insertion of a counter-cock at W, or by so arranging the ports that certain positions of the plug will open or close either or both of the ports.

At the centre of the back of the box H, and projecting forward therefrom, is the stud N, to the front end of which I pivot the lever O, and this lever bears at one end the hollow metallic shell K, and at the other end the solid counterpoise P. The shell K is made of metal sufficient in thickness to render it proof against all mechanical or other injuries to which it can ordinarily be exposed, and which might otherwise disable it. It may be cast hollow, or it may be constructed in any other desirable way. The counterpoise P regulates the buoyancy of the shell K as may be desired, though it is only required or desirable that it should be sufficiently buoyant to rise with certainty when the water rises in the box.

A small port, R, communicates with the bottom of the cylinder G, beneath the piston F, and this port is closed by the upper end of the valve-rod S, which is attached at its lower end by a joint to the lever O, at a point between the shell K and the pin upon which said lever moves, so that as said shell rises, the port R will be closed, and as the shell sinks, the port will be uncovered.

The operations of the parts above described will be easily understood. Suppose the cock in the pipe V to be closed, then communication with the steam-space will be cut off. Suppose, also, that the water in the boiler stands at or above the level of the top of the box H. The float K will then have risen with the water until its upward movement is arrested by the rod S, closing the port R. The port R will remain closed until the water in the boiler and box H has fallen below the point of buoyancy of the float K, when the latter will immediately begin to sink, and withdraw the rod S from the fork R. No effect will be observed, however, until the water in the boiler has fallen so as to uncover the port I, when steam will pass into the box H, and through the port R into the cylinder G, and the piston F will be forced upward immediately, and the cock C will be opened, and an alarm sounded by the whistle B.

In practice, however, the steam-pipe V would be always open, and steam would be always present in the top of the box H as soon as the water had fallen below the top of the same, and therefore the piston F would be operated as soon as the sinking of the shell should uncover the port R, and the alarm would then be sounded before the extreme low-water mark would be reached.

To test the operative condition of the apparatus it would only be required that the port I should be closed and the port L opened, so as to let the enclosed water escape. The shell K would then sink and uncover the port R, and the steam from the pipe V would immediately operate the piston F and sound the whistle, as though the water were low in the boiler. If upon this test the piston F is not raised, nor the whistle sounded, then the engineer is at once aware that the apparatus is obstructed, and by shutting off the steam through the pipe V, and removing the cover a, he may without difficulty or loss of time make the necessary adjustment or repairs. Admission of water to the box H immediately raises the float and closes the port R, and then, by opening the cock U, the steam within the cylinder may escape, and the piston be depressed by the hand.

Now, it will readily be perceived that, instead of depending upon the slight and unreliable power of a float to open the cock C to sound the whistle, I secure a power equal to the steam-pressure in the boiler to turn said cock, and it may readily be assumed that no friction from clogging or otherwise can obstruct the movement of said cock in opposition to such a power, while the slight force required to be exerted by the float K to move upon its own pivot, and to withdraw the valve-rod S, will not be neutralized by any deposits or corrosion which can occur within the box H. Instead of hanging the lever O upon a pin, friction may be still further reduced by hanging said arm upon knife-edges.

In all of the figures, excepting fig. 1, the apparatus is represented full size.

Not a small item among the advantages of this apparatus is its small size, compact form, and easy construction.

It is evident that the above-described apparatus may be employed for other purposes than those described, as in opening a feed-water valve, &c.

Having described my invention, what I claim as new, is—

1. The combination of the following devices in a low-water alarm for steam-generators, viz, the box H, passages I and V, each with a cock, float K, valve S, port R, cylinder G, piston F, connected to the lever of the alarm-cock, a discharge-port from cylinder G, closed or opened by cock U, discharge-port L, and detachable cover a, or the equivalents of these parts.

2. The construction of the cock J, with the ports I and L, as described, in combination with the box H, substantially as set forth.

3. The tubular piston-rod T with the cock U, substantially as set forth.

JEARUM ATKINS.

Witnesses:
    ANDREW WHITELEY,
    R. D. O. SMITH.